US008842150B2

(12) United States Patent
Kumarasamy et al.

(10) Patent No.: US 8,842,150 B2
(45) Date of Patent: Sep. 23, 2014

(54) SESSION INITIATION PROTOCOL (SIP)-H.323 VIDEO INTERWORK

(75) Inventors: Parameswaran Kumarasamy, San Jose, CA (US); Paul R. Chu, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 2127 days.

(21) Appl. No.: 11/643,066

(22) Filed: Dec. 20, 2006

(65) Prior Publication Data

US 2008/0151037 A1    Jun. 26, 2008

(51) Int. Cl.
*H04N 7/14* (2006.01)
*H04L 29/06* (2006.01)

(52) U.S. Cl.
CPC ............ *H04N 7/147* (2013.01); *H04L 65/1069* (2013.01); *H04L 65/104* (2013.01); *H04L 65/1009* (2013.01); *H04L 65/1006* (2013.01)
USPC .................. 348/14.01; 348/14.08; 348/14.09; 348/E7.077

(58) Field of Classification Search
USPC ........... 379/93.31, 219, 265.09, 88.13, 93.21, 379/158; 370/395.52, 466, 467, 260, 261, 370/262, 263; 348/14.01, 14.1, 14.12, 348/14.08, 14.09, E7.077, E7.081
See application file for complete search history.

(56) References Cited

U.S. PATENT DOCUMENTS

2002/0199203 A1 * 12/2002 Duffy et al. .................... 725/109
2006/0123013 A1 *  6/2006 Ryu et al. ......................... 707/10

OTHER PUBLICATIONS

H.Schulzrinne, "Session Initation Protocol (SIP)—H.323 Interworking Requirements" Jul. 2005.*
H.Schulzrinne, Session Initiation Protocol (SIP)—H.323 Interworking Requirements, Jul. 2005.*
H.Schulzrinne, Session Initiation Protocol (SIP)—H.323 Interworking requirement, Jul. 2005, Columbia University, 15 pages.*
H. Schulzrinne, et al., "RFC 4123 on Session Initiation Protocol (SIP)—H.323 Interworking Requirements", Aquired at: ftp://ftp.rfc-editor.org/in-notes/rfc4123.txt, 15 pages, Jul. 2005, Network Working Group, Columbia University, Category: Informational.
Hemant Agrawal, et al., "SIP-H.323 Interworking Requirements", Internet Engineering Task Force, Jul. 2002, 19 pages.

* cited by examiner

*Primary Examiner* — Duc Nguyen
*Assistant Examiner* — Yosef K Laekemariam
(74) *Attorney, Agent, or Firm* — Edwards Wildman Palmer LLP; James M. Behmke; Jonathon P. Western

(57) ABSTRACT

In one embodiment, a first message for a video call is received from a first end point. The first end point may be communicating using a first protocol, such as H.323. The first message is for a second end point that communicates using a second protocol, such as SIP. The first message may be an early offer in SIP to start a video call. The first message includes media information that is needed to initiate the video call. The media information is stored and may be later used to initiate the video call with the second end point. The stored media information is mapped to one or more messages that are sent to the second end point to initiate the video call using a slow start initiation procedure in H.323.

19 Claims, 4 Drawing Sheets

SESSION INITIATION PROTOCOL (SIP)-H.323 VIDEO INTERWORK

TECHNICAL FIELD

Particular embodiments generally relate to networking.

BACKGROUND

Voice-over IP (VoIP) is becoming increasingly popular for multi-media communications. The number of VoIP deployments is increasing allowing both audio and video calls. The majority of existing VoIP video end points are H.323-based and new video end points are session initiation protocol (SIP)-based. Interworking basic connections between the H.323 and SIP protocols has been described. The initiation of a call may proceed in a slow start or fast start in H.323 and an early offer or delayed offer in SIP. In audio calls, the interworking has been defined for early offer to fast start and delayed offer to slow start connections. In video, however, H.323 video end points conventionally only support slow start connections. Thus, if the audio interworking procedures are used, then video calls would always be interworked from a slow start to delayed offer.

DESCRIPTION OF EXAMPLE EMBODIMENTS

Overview

Particular embodiments generally relate to interworking between protocols for video.

In one embodiment, a first message for a video call is received from a first end point. The first end point may be communicating using a first protocol, such as H.323. The first message is for a second end point that communicates using a second protocol, such as SIP. The first message is for providing a video call set-up using a first call set-up procedure. For example, the first message may be an early offer in SIP to start a video call. The first message includes media information that is needed to provide the video call.

The media information is stored and may be later used to provide the video call with the second end point. The stored media information is mapped to one or more messages that are sent to the second end point to provide the video call using a second call set-up procedure. The second call set-up procedure may be a slow start call set-up procedure in H.323. Thus, an early offer to slow start interworking is provided. The media information received in the first message is mapped to the one or more messages that are needed to provide a slow start video call in H.323.

Example Embodiments

Figure 1:
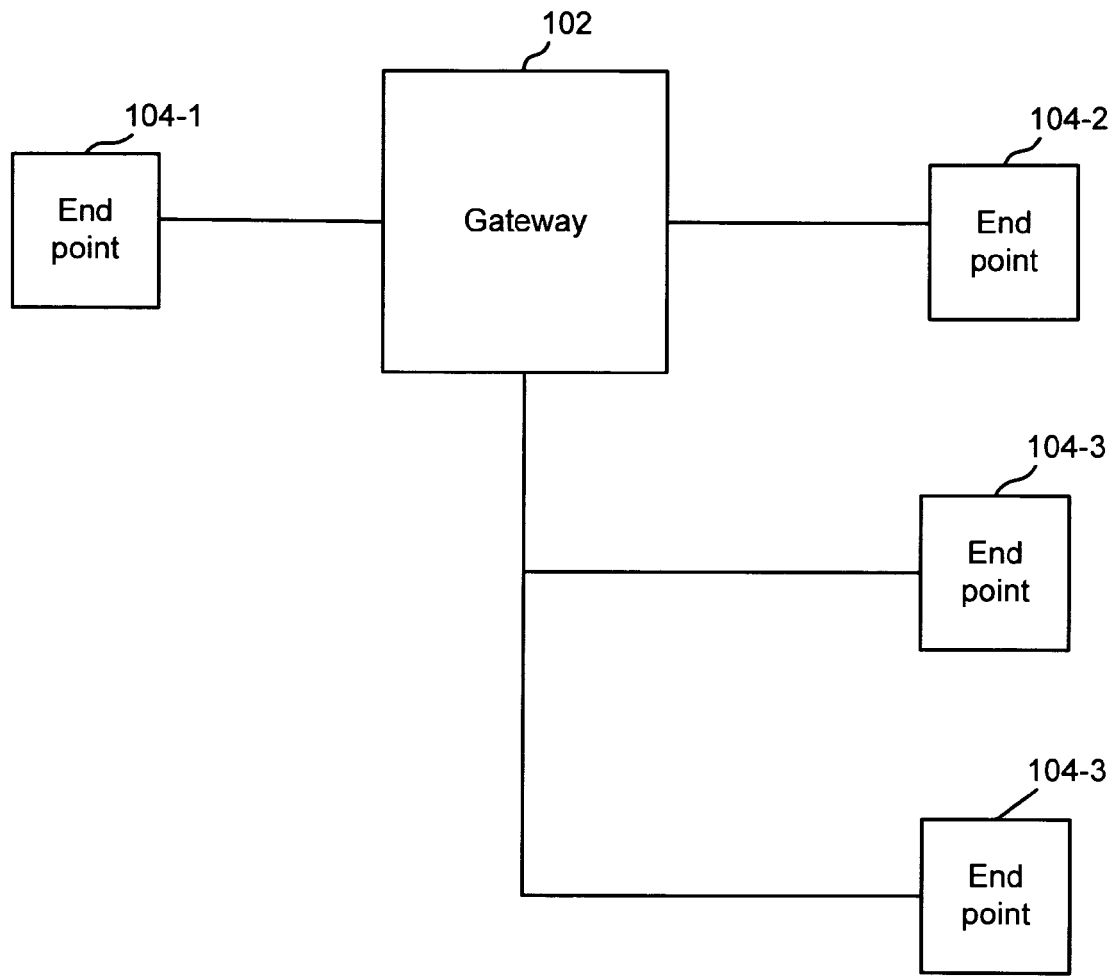
FIG. 1 depicts an example system for providing interworking between call set-up procedures.

FIG. 1 depicts an example system 100 for providing interworking between call set-up procedures. As shown, a gateway 102 and end points 104 (EP1, EP2, EP3, and EP4) are provided.

End points 104 may be any devices that can participate in a communication. For example, end points 104 may include VoIP telephones, computers, cell phones, soft phones, personal digital assistants, or any other devices that can participate in a communication.

End points 104 may communicate using either the H.323 protocol or SIP. Although H.323 and SIP are described, it will be recognized that other protocols may be appreciated. For example, successor protocols or enhancements to H.323 and/or SIP may be used by particular embodiments.

Gateway 102 may be any network device configured to manage communications with end points 104. In one embodiment, gateway 102 includes session border controllers, SIP proxies, IP-PBXs, media gateways, soft switches, back-to-back user agents (B2BUAs), IP-to-IP gateways, etc. Gateway 102 sits in-between end points 104 and may interconnect various networks that use different protocols and services. In one particular embodiment, end point 104-1, end point 104-2, and end point 104-3 may be in different networks. They may be interconnected via gateway 102.

Gateway 102 is configured to provide interworking between different protocols. In one example, end point 104-1 may communicate using a first protocol and end point 104-2, end point 104-3, and/or end point 104-4 may communicate using a second protocol. Gateway 102 provides interworking between different protocols such that end point 104-1 may communicate with end point 104-2, end point 104-3, and/or end point 104-4.

The interworking is provided for video calls between end points 104. Video calls may include any communications in which data for video is sent. Video may include any visual information that is sent in the call and does not necessarily have to include audio but can. For example, video calls may include streaming media, video telephone calls, video instant messaging sessions, etc. The interworking may include any messages sent for a video call. This includes the messages needed to establish a media flow between end points 104. For example, protocols, such as SIP and H.323, define control messages that are needed to set up a media flow.

H.323 end points 104 have conventionally been the choice for VoIP system set-ups. However, SIP video end points 104 are increasingly being used. Accordingly, gateway 102 is configured to interwork messages between H.323 end points 104 and SIP end points 104. Interworking between H.323 and SIP has been defined for audio calls. SIP includes two different methods for providing a call, early offer and delayed offer. Early offer is when media information is presented typically with the first invite that is sent. Delayed offer is when the media information is delayed or sent at a later time after the first invite message. For H.323, the fast start is when media is proposed as part of the SETUP. A slow start is when the media is proposed after SETUP.

The majority of H.323 end points 104 initiate video calls using the slow start procedure. Using convention interworking, the slow start is interworked to a delayed offer in SIP. Accordingly, to be compatible with H.323 end points 104, SIP end points 104 had to conventionally use the delayed offer because for SIP initiated early offer video calls, no mechanism conventionally existed to interwork it with H.323. Thus, the media connection is delayed because the slow start delays the sending of media information that is needed to set up a video call. However, particular embodiments provide interworking from an early offer to slow start when a SIP end point 104 initiates the video call request and also from a slow start to delayed offer when an H.323 end point 104 initiates the video call request. This provides more robust interworking and also allows SIP end points 104 to initiate video calls using early offer.

Figure 2:
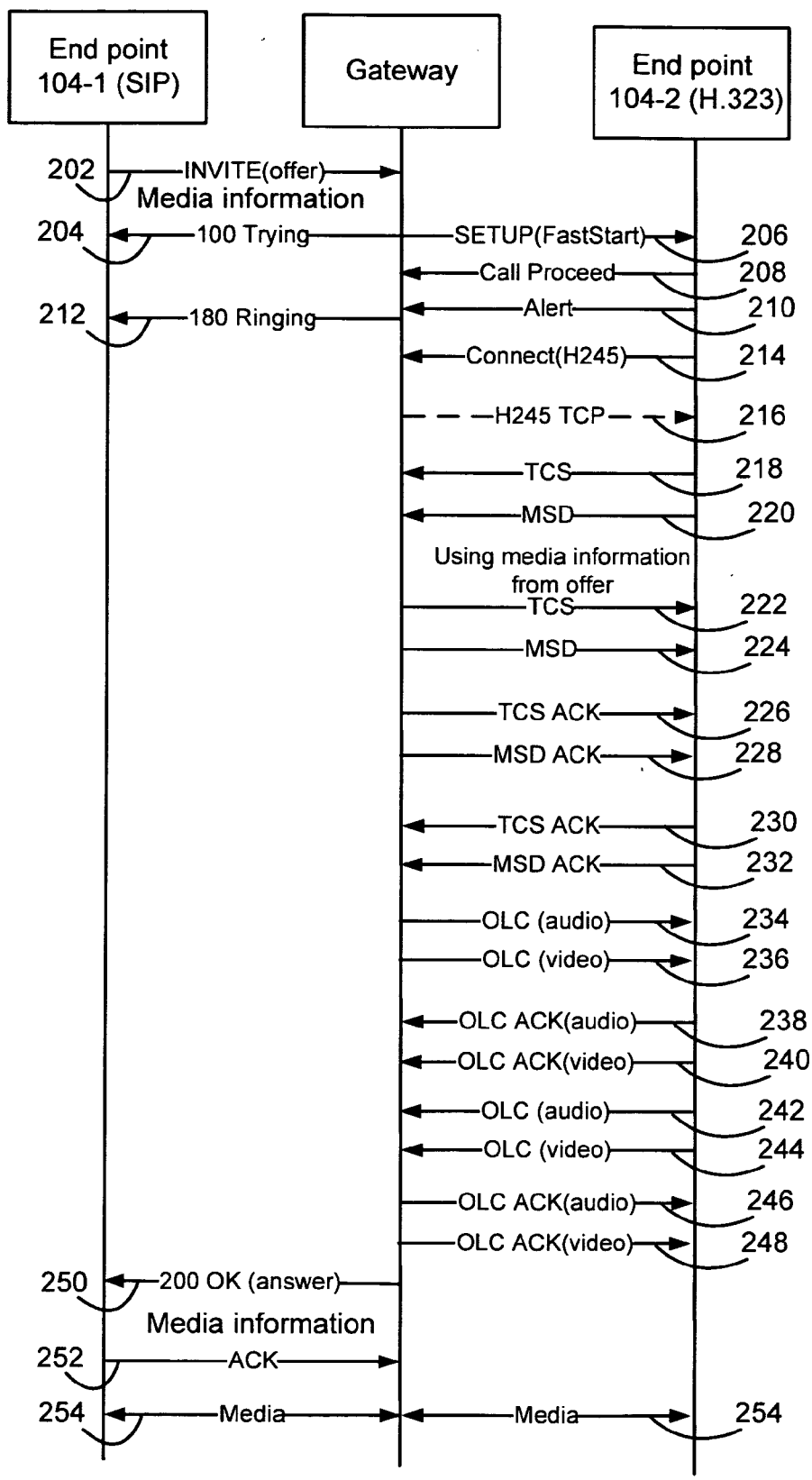
FIG. 2 depicts an example of a call flow for interworking an early offer to a slow start.

FIG. 2 depicts an example of a call flow for interworking an early offer to a slow start. As shown, SIP end point 104-1 initiates a video call request with H.323 end point 104-2. At 202, SIP end point 104-1 sends an invite message to gateway 102. The invite message includes an offer and is thus a message for an early offer call set-up procedure. As shown, the invite message includes media information for the call set-up. Media information may include media information for setting up an audio and/or video call. Examples of media information include the IP address, port number, CODEC, DTMF, Voice activity detection (VAD) enable/disable or any other media information.

The media information is stored by gateway 102. If the early offer to fast start interworking was being used, then the media information would be forwarded to H.323 end point 104-2 in the next message (before a Connect message). However, because the early offer to slow start interworking is being provided, the media information is stored for matched to messages sent to establish a media connection after a H.245 connection is received from H.323 end point 104-2.

To store the media information, the session description protocol (SDP) of invite message 202 may be parsed and the appropriate media information is determined. This media information is stored.

At 204, gateway 102 then sends a 100 Trying message back to SIP end point 104-1. Also, at 206, gateway 102 sends a SETUP message to H.323 end point 104-2. The SETUP message is sent but does not include any fast start elements as video capability of media information is not included. At 208 and 210, end point 104-2 sends a Call Proceed message and an Alert message back to gateway 102. At 212, gateway 102 then sends a 180 Ringing message to SIP end point 104-1.

The Connect message or any other equivalent message with H.245 address is a signal to initiate a H.245 connection with end point 104-2. In this case, the Connect message includes an H.245 address, which is used to initiate an H.245 transfer control protocol (TCP) connection at 216. Procedures other than H.245 for setting up a video call will also be appreciated.

At 218, H.323 end point 104-2 sends a terminal capability set (TCS) message. The TCS message includes the capabilities for H.323 end point 104-2. For example, the capabilities may include the CODECs supported, audio/video formats supported, DTMF, FAX, Modem capabilities.

At 220, a master-slave determination (MSD) is sent. The MSD message determines which end point 104 should be the master and which one should be the slave.

At 222, the TCS message is then sent from gateway 102 to H.323 end point 104-2. The TCS message includes the capabilities of SIP end point 104. In this case, the media information that was stored from the invite message is mapped to the TCS message. For example, the media information included may be the CODEC supported and audio/video formats that are supported. At 224, gateway 102 then sends the MSD message to H.323 end point 104-2. This is an answer as to which end point 104 should be the master and which should be the slave.

At 226, 228, 230, and 232 gateway 102 and end point 104 send ACKs for the TCS and MSD messages.

At 234 and 236, gateway 102 then sends an open logical channel (audio) (OLC(audio)) message and an OLC (video) message to H.323 end point 104-2. Gateway 102 determines the information included in the OLC message. This exchanges the port/IP address in addition to the CODEC that will be used in the video call. This message is to open the logical channel and contains information to allow the reception and codification of the data. The information for the reception and codification data may be for SIP end point 104-1. For example, the CODEC, IP address, and port that is going to be used by SIP end point 104-1 is sent. H.323 end point 104-2 then sends an ACK for the audio and video OLC messages at 238 and 240. The OLC carries IP address, port for RTCP session and also codec parameters such as codec name, bytes. The OLC ACK carries IP address, port for RTP and RTCP sessions, in addition to codec parameters.

At 242 and 244, H.323 end point 104-2 then sends OLC (audio) and OLC (video) messages to gateway 102. This may include information for reception and codification that H.323 end point 104 wants to use. For example, the CODEC that H.323 end point 104-2 wants to use may be included. For example, if end point 104-2 wants to use a G711.u CODEC, then that is included in OLC message at 244. At 246 and 248, OLC ACK messages are sent at OLC ACK (audio) and OLC ACK (video).

At 250, a 200 OK (answer) message is sent from gateway 102 to SIP end point 104-1. This message includes media information for SIP end point 104-1. The media information may include the capabilities that were negotiated with H.323 end point 104-2. For example, the CODEC, IP address, and port may be included in 200 OK (answer) message.

At 252, end point 104-1 sends an ACK message to gateway 102. At 254, a media stream is initiated. Thus, media, such as audio and/or video, flows between SIP end point 104-1 and H.323 end point 104-2 through gateway 102.

Accordingly, an early offer to slow start interworking for a video call is provided. By storing the media information received in an early offer message, the media information may be mapped to messages that need to be sent for a slow start video call. The correct capabilities are negotiated with H.323 end point 104 by mapping the media information to the messages.

Although only audio and video lines are shown, the call flow may be used for any multi-media handling including data. Also, although the call flow above is described as media flow through (media flows between end points 104 via gateway 102), it may be used for media flow around (media flows directly between end points 104 not via gateway 102).

Figure 3:
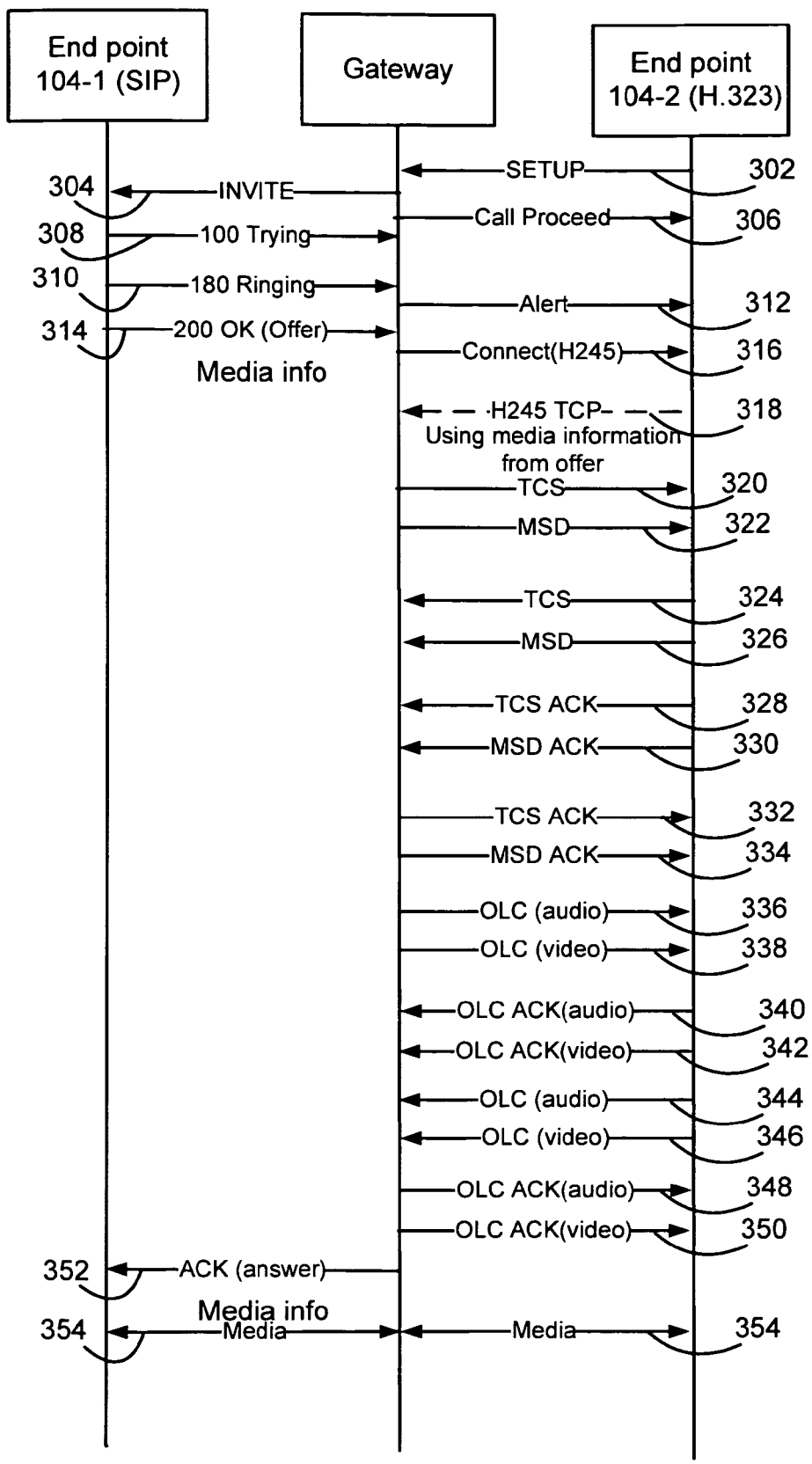
FIG. 3 depicts an example of call flow for interworking a slow start to delayed offer.

Also, gateway 102 may provide interworking for a slow start to delayed offer video call in one embodiment. FIG. 3 depicts an example of call flow for interworking a slow start to delayed offer. At 302, H.323 end point 104-2 sends a set-up message. Gateway 102 interworks the set-up message to an invite message at 304. Gateway 102 then sends a Call proceed message at 306 to H.323 end point 104-2. Also, SIP end point 104-1 sends a 100 Trying message at 308 and a 180 Ringing message at 310. Gateway 102 then sends an Alert message 312 to H.323 end point 104-2.

SIP end point 104-1 then sends a 200 OK (offer) message at 314. This message includes media information. Accordingly, this is a delayed offer in SIP as the media information and offer was not included in the initial invite.

Gateway 102 then sends a connect (with H.245 address) message at 316. At 318, an H.245 TCP connection is initiated.

At 320, the TCS message is then sent from gateway 102 to H.323 end point 104-2. The TCS message includes the capabilities of SIP end point 104. In this case, the media information that was stored from the 200 OK message is mapped to the TCS message. For example, the media information included may be the CODEC supported and audio/video formats that are supported.

At 322, a master-slave determination (MSD) is sent. The MSD message determines which end point 104 should be the master and which one should be the slave.

At 324, end point 104-2 then sends a TCS message to gateway 102. The TCS message includes the capabilities for H.323 end point 104-2.

At 326, end point 104-2 then sends a MSD message to gateway 102. This is an answer as to which end point 104 should be the master and which should be the slave.

At 328, 330, 332, and 334 gateway 102 and end point 104 send ACKs for the TCS and MSD messages.

At 336 and 338, gateway 102 then sends an open logical channel (audio) (OLC(audio)) message and an OLC (video) message to H.323 end point 104-2. Gateway 102 determines the information included in the OLC message. This exchanges the port/IP address in addition to the CODEC that will be used in the video call. This message is to open the logical channel and contains information to allow the reception and codification of the data. The information for the reception and codification data may be for SIP end point 104-1. For example, the CODEC, IP address, and port that is going to be used by SIP end point 104-1 is sent. H.323 end point 104-2 then sends an ACK for the audio and video OLC messages at 340 and 342.

At 344 and 346, H.323 end point 104-2 then sends OLC (audio) and OLC (video) messages to gateway 102. This may include information for reception and codification that H.323 end point 104 wants to use. For example, the CODEC that H.323 end point 104-2 wants to use may be included. For example, if end point 104-2 wants to use a G711.u CODEC, then that is included in OLC message at 344. At 348 and 350, OLC ACK messages are sent at OLC ACK (audio) and OLC ACK (video).

At 352, an ACK (answer) message is sent from gateway 102 to SIP end point 104-1. This message includes media information for SIP end point 104-1. The media information may include the capabilities that were negotiated with H.323 end point 104-2. For example, the CODEC, IP address, and port may be included in 200 OK (answer) message.

At 354, a media stream is initiated. Thus, media, such as audio and/or video, flows between SIP end point 104-1 and H.323 end point 104-2 through gateway 102. The connection may be audio, video, or a combination of both. A bi-directional audio and video media path may be set up based on fields set in the prior messages. For example, if a=SEND RECV, then a bidirectional audio and video media path may be set up. Also, other combinations of the a=attribute including a=SENDONLY, RECVONLY, and INACTIVE may be used to decide the audio and video path establishments and its directions.

Accordingly, a slow start to a delayed offer interworking for a video call is provided. By storing the media information received in the slow start, the media information may be mapped to messages that need to be sent for a delayed offer video call and vice versa. The correct capabilities are negotiated with the SIP end point 104 by mapping the media information to the messages.

Figure 4:
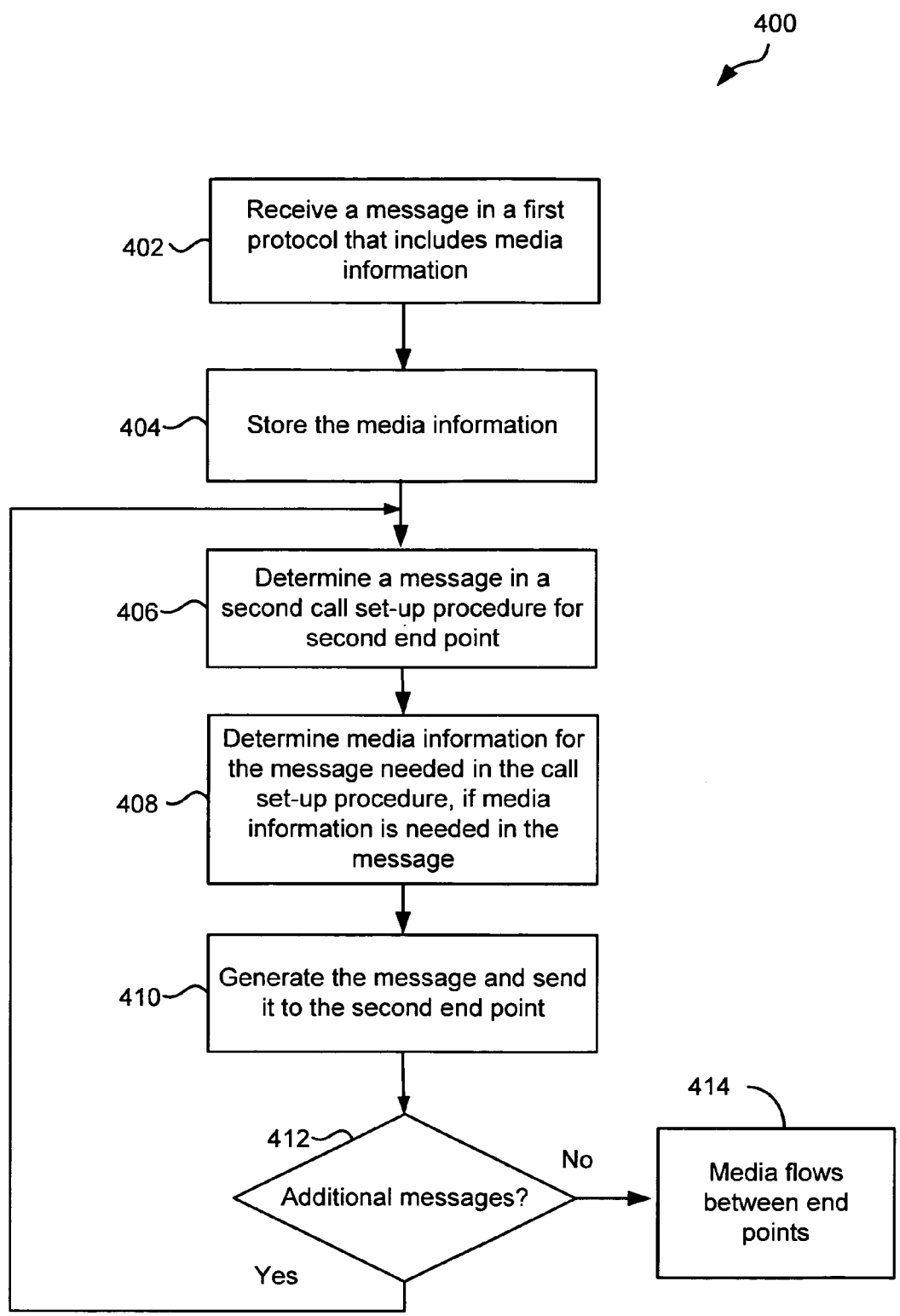
FIG. 4 depicts an example of a method for interworking an early offer to slow start.

FIG. 4 depicts an example of a method for interworking an early offer to slow start. Step 402 receives a message in a first protocol for a first call set-up procedure where the message includes media information. The call set-up procedure may be any procedure that uses a number of messages to set up a media flow between end points. For example, if an initial invite message includes an offer, then it is assumed that an early offer call procedure is being used. The call procedure may define certain messages that need to be sent to initiate a call. For example, control messages may be sent to set up a call such that media can flow between end points 104.

At step 404, gateway 102 stores the media information. The media information may be stored in cache, a buffer, etc.

At step 406, gateway 102 determines a message in a second call set-up procedure for second end point 104-2. For example, a slow start procedure may be initiated with a SIP end point 104-2.

Step 408 determines media information for the message needed in the call set-up procedure, if media information is needed in the message. For example, media information that needs to be mapped to call set-up messages in H.323 is determined from the stored media information. This may involve parsing the media information received in the SDP and determining what type of information it is. For example, the SDP is parsed to determine the different capabilities for end point 104-1. In one example, the different CODECs supported are determined and stored as the CODECs supported by end point 104-1. Further, the IP address, RTP/RTCP addresses may also be determined and stored. When gateway 102 determines that certain information is needed for interworking a message to end point 104-2, it is retrieved from storage. For example, when a TCS message is going to be sent, gateway 102 determines the capabilities and generates a TCS message with this information. Thus, gateway 102 can intelligently determine which media information needs to be included in messages generated for end point 104-2.

Step 410 then generates the message needed for the call set-up procedure and sends it to end point 104-2. For example, the message may include a TCS, MSD, OLC, or any other message.

Step 412 determines if additional messages need to be sent. For example, messages may be sent and responses may be received in the call set-up procedure.

If more messages need to be sent for the media flow set-up, the method reiterates to step 406 where additional information needed for a new message to be sent is determined. This information is determined from the stored media information. The process then proceeds as described above.

At step 414, media flows between end points 104-1 and 104-2.

In communications among one another, end points 104 may not all be video end points. For example, end points 104-3 and 104-4 may be audio-only end points while end points 104-1 and end points 104-2 are video end points. Gateway 102 may determine the capabilities of end points 104 (that is if they are audio or video, or any combination), and include a field in a header to indicate the capabilities of the other end point 104. For example, the bearer capability layer 1 protocol indicates if the call is a video or audio (G.711u or G.711a). This information may be included in a message sent to an end point 104. For example, information indicating if the call is audio or video may be included in a SIP header to indicate that an H.323 end point is video capable or not. Further, when an offer from a SIP end point has video capability, it can be included in a message sent to H.323 end point indicating that the SIP end point is video capable. This helps indicate to the remote end point which information is needed in the call set-up. For example, if an audio-only end point calls a video-capable end point via gateway 102, then video capabilities do not need to be exchanged. Thus, gateway 102 can determine this and send information to the video-capable end point that it is dealing with an audio end point. The video end point does not need to then exchange video capabilities with gateway 102. This saves information and a message overhead if the video capabilities do not need to be exchanged.

In one embodiment, a new field in a SIP header may be used to send the indication whether or not the end point is video or audio capable. For example, the bearer capability layer 1 protocol in H.323 may be mapped to a new field in a SIP header.

Gateway 102 may also provide further services. For example, if customers do not want certain capabilities to be allowed, they may be filtered from messages. For example, if the CODEC G.711 is not desired, then the capability may be filtered out of the media information received from a SIP end point. Thus, the H.323 end point does not have an option to choose that capability.

Accordingly, particular embodiments provide many advantages. An early offer to slow start interworking is provided. This allows SIP end points to use an early offer when initiating a video call. Because H.323 end points typically are only enabled for a slow start, then this enables SIP end points to not have to use the delayed offer to start a video call. Further, gateway 102 provides a simple and efficient method to achieve SIP to H.323 early offer to slow start handling.

Although the description has been described with respect to particular embodiments thereof, these particular embodiments are merely illustrative, and not restrictive. Interworking between protocols other than SIP and H.323 may be appreciated.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
receiving a first message in a first protocol for a video call between a first end point communicating in the first protocol and a second end point communicating in a second protocol, the first message for setting up the video call using a first call set-up procedure, wherein the first message includes media information;
storing the media information included in the first message;
initiating a second call set-up procedure with the second end point for connecting the second end point and the first end point for the video call, the second call set-up procedure including a second message sent to the second end point for setting up the video call, wherein the second message does not include the media information; and
based on initiating the second call set-up procedure, exchanging messages with the second end point for establishing the video call between the first end point and the second end point, comprising:
determining, from the stored media information, information on capabilities of the first end point for supporting the video call; and
mapping the information on capabilities of the first end point for supporting the video call to additional messages that are sent to the second end point for establishing the video call between the first end point and the second end point.

2. The method of claim 1, wherein the first call set-up procedure comprises an early offer call set-up procedure and the second call set-up procedure comprises a slow start call set-up procedure.

3. The method of claim 1, wherein the first call set-up procedure comprises a slow start call procedure and the second call set-up procedure comprises a delayed offer call procedure.

4. The method of claim 1, further comprising receiving one or more messages from the second end point in response to the additional messages that are sent to the second end point, wherein the one or more messages and the additional messages are used to set up a media flow between the first end point and the second end point.

5. The method of claim 1, further comprising:
determining if the second end point and/or the first end point is video capable;
if the first end point is not video capable, sending a message to the second end point indicating that the first end point is not video capable, wherein the second end point does not perform a negotiation for video capabilities; and
if the second end point is not video capable, sending a message to the first end point indicating that the second end point is not video capable, wherein the first end point does not perform a negotiation for video capabilities.

6. The method of claim 1, further comprising:
determining preferences configured by the second end point indicating capabilities restricted by the second end point that include capabilities that are not desired; and
based on determining the preferences configured by the second end point, filtering media information in the stored media information such that information on capabilities restricted by the second end point are not sent to the second end point.

7. The method of claim 1, wherein the first protocol is SIP and the second protocol is H.323.

8. An apparatus comprising:
one or more processors; and
logic encoded in one or more tangible media for execution by the one or more processors and when executed operable to cause the one or more processors to perform operations comprising:
receiving a first message in a first protocol for a video call between a first end point communicating in the first protocol and a second end point communicating in a second protocol, the first message for setting up the video call using a first call set-up procedure, wherein the first message includes media information;
storing the media information included in the first message;
initiating a second call set-up procedure with the second end point for connecting the second end point and the first end point for the video call, the second call set-up procedure including a second message sent to the second end point for setting up the video call, wherein the second message does not include the media information; and
based on initiating the second call set-up procedure, exchanging messages with the second end point for establishing the video call between the first end point and the second end point, comprising logic that cause the one or more processors to perform operations comprising:
determining, from the stored media information, information on capabilities of the first end point for supporting the video call; and
mapping the information on capabilities of the first end point for supporting the video call to additional messages that are sent to the second end point for establishing the video call between the first end point and the second end point.

9. The apparatus of claim 8, wherein the first call set-up procedure comprises an early offer call set-up procedure and the second call set-up procedure comprises a slow start call set-up procedure.

10. The apparatus of claim 8, wherein the first call set-up procedure comprises a slow start call procedure and the second call set-up procedure comprises a delayed offer call procedure.

11. The apparatus of claim 8, wherein the logic when executed is further operable to cause the one or more processors to perform operations comprising receiving one or more messages from the second end point in response to the additional messages that are sent to the second end point, wherein the one or more messages and the additional messages are used to set up a media flow between the first end point and the second end point.

12. The apparatus of claim 8, wherein the logic when executed is further operable to cause the one or more processors to perform operations comprising:
   determining if the second end point and/or the first end point is video capable;
   based on determining that the first end point is not video capable, sending a message to the second end point indicating that the first end point is not video capable, wherein the second end point does not perform a negotiation for video capabilities; and
   based on determining that the first end point is not video capable, sending a message to the first end point indicating that the second end point is not video capable, wherein the first end point does not perform a negotiation for video capabilities.

13. The apparatus of claim 8, wherein the logic when executed is further operable to cause the one or more processors to perform operations comprising:
   determining preferences configured by the second end point indicating capabilities restricted by the second end point that include capabilities that are not desired; and
   based on determining the preferences configured by the second end point, filtering media information in the stored media information such that information on capabilities restricted by the second end point are not sent to the second end point.

14. The apparatus of claim 8, wherein the first protocol is SIP and the second protocol is H.323.

15. An apparatus comprising:
   means for receiving a first message in a first protocol for a video call between a first end point communicating in the first protocol and a second end point communicating in a second protocol, the first message for setting up the video call using a first call set-up procedure, wherein the first message includes media information;
   means for storing the media information included in the first message;
   means for initiating a second call set-up procedure with the second end point for connecting the second end point and the first end point for the video call, the second call set-up procedure including a second message sent to the second end point for setting up the video call, wherein the second message does not include the media information; and
   means based on initiating the second call set-up procedure, exchanging messages with the second end point for establishing the video call between the first end point and the second end point, comprising:
      means for determining, from the stored media information, information on capabilities of the first end point for supporting the video call; and
      means for mapping the information on capabilities of the first end point for supporting the video call to additional messages that are sent to the second end point for establishing the video call between the first end point and the second end point.

16. The apparatus of claim 15, wherein the first call set-up procedure comprises an early offer call set-up procedure and the second call set-up procedure comprises a slow start call set-up procedure.

17. The apparatus of claim 15, wherein the first call set-up procedure comprises a slow start call procedure and the second call set-up procedure comprises a delayed offer call procedure.

18. The apparatus of claim 15, wherein the first protocol is SIP and the second protocol is H.323.

19. A method comprising:
   receiving from a first end point that communicates using a first protocol a first message for a first video call set-up procedure, the first message including media information and associated with establishing a video call between the first end point and a second end point that communicates using a second protocol;
   storing the media information included in the first message;
   initiating a second call set-up procedure with the second end point for connecting the second end point and the first end point for the video call, the second call set-up procedure including a second message sent to the second end point for setting up the video call, wherein the second message does not include the media information; and
   based on initiating the second call set-up procedure, exchanging messages with the second end point for establishing the video call between the first end point and the second end point, comprising:
      determining, from the stored media information, information on capabilities of the first end point for supporting the video call;
      mapping the information on capabilities of the first end point for supporting the video call to additional messages that are sent to the second end point; and
      facilitating a media flow between the first end point and the second end point.

* * * * *

UNITED STATES PATENT AND TRADEMARK OFFICE
CERTIFICATE OF CORRECTION

PATENT NO. : 8,842,150 B2
APPLICATION NO. : 11/643066
DATED : September 23, 2014
INVENTOR(S) : Kumarasamy et al.

Page 1 of 1

It is certified that error appears in the above-identified patent and that said Letters Patent is hereby corrected as shown below:

In the Specification

In column 8, line 59, please amend as follows:
that follow, "a", [[an]]"an", and "the" includes plural references unless

Signed and Sealed this
Eleventh Day of August, 2015

Michelle K. Lee
*Director of the United States Patent and Trademark Office*